(12) United States Patent
Kasahara

(10) Patent No.: US 10,547,818 B2
(45) Date of Patent: Jan. 28, 2020

(54) IMAGE PROJECTION DEVICE AND PLANETARIUM APPARATUS USING SAME

(71) Applicant: Kabushikigaisha Goto Kogaku Kenkyusho, Tokyo (JP)

(72) Inventor: Makoto Kasahara, Tokyo (JP)

(73) Assignee: Kabushikigaisha Goto Kogaku Kenkyusho, Tokyo (JP)

(*) Notice: Subject to any disclaimer, the term of this patent is extended or adjusted under 35 U.S.C. 154(b) by 0 days.

(21) Appl. No.: 16/085,282

(22) PCT Filed: Mar. 17, 2017

(86) PCT No.: PCT/JP2017/010855
§ 371 (c)(1),
(2) Date: Sep. 14, 2018

(87) PCT Pub. No.: WO2017/164102
PCT Pub. Date: Sep. 28, 2017

(65) Prior Publication Data
US 2019/0037182 A1 Jan. 31, 2019

(30) Foreign Application Priority Data
Mar. 22, 2016 (JP) ................... 2016-057674

(51) Int. Cl.
*H04N 9/31* (2006.01)
*G09B 27/00* (2006.01)
(Continued)

(52) U.S. Cl.
CPC ......... *H04N 9/3147* (2013.01); *G03B 21/145* (2013.01); *G03B 37/04* (2013.01); *G09B 27/00* (2013.01)

(58) Field of Classification Search
CPC .... H04N 9/3147; G03B 21/145; G03B 37/04; G09B 27/00
(Continued)

(56) References Cited

U.S. PATENT DOCUMENTS 5,414,521 A * 5/1995 Ansley .................. G02B 27/18
348/123
6,141,034 A * 10/2000 McCutchen ........... G02B 27/22
348/36

(Continued)

FOREIGN PATENT DOCUMENTS

JP 60-230682 11/1985
JP 7-181889 7/1995
(Continued)

OTHER PUBLICATIONS

PCT/JP2017/010855, International Search Report and Written Opinion dated May 16, 2017, 2 pages—English; 7 pages—Japanese.

*Primary Examiner* — Jefferey F Harold
*Assistant Examiner* — Mustafizur Rahman
(74) *Attorney, Agent, or Firm* — Andrew F. Young, Esq.; Lackenbach Siegel, LLP

(57) ABSTRACT

The present invention implements the movement of an object in an image projected onto a dome-shaped screen while maintaining an original resolution without increasing the resolution of a video projector as a projection device. In a device for projecting an image onto the dome-shaped screen D, an aggregate of two or more video projectors 1A, 1B for projecting a moving image is disposed in a dome such that the range of projection from the aggregate covers the whole sphere, and the aggregate is mounted on a stand 2 having two or more rotating shafts.

2 Claims, 2 Drawing Sheets

(51) Int. Cl.
*G03B 37/04* (2006.01)
*G03B 21/14* (2006.01)

(58) Field of Classification Search
USPC .... 348/745, 744, 333.1, 136, 123, 105, 102, 348/36; 353/79, 98; 359/443
See application file for complete search history.

(56) References Cited

U.S. PATENT DOCUMENTS

| | | | | |
|---|---|---|---|---|
| 2002/0196538 | A1* | 12/2002 | Lantz | H04N 9/3141 359/443 |
| 2007/0171383 | A1* | 7/2007 | Deves | G03B 21/54 353/79 |
| 2008/0002161 | A1* | 1/2008 | Streid | G03B 21/32 353/98 |
| 2009/0147153 | A1* | 6/2009 | Hasegawa | H04N 5/20 348/744 |
| 2010/0197354 | A1* | 8/2010 | Lee et al. | G03B 29/00 455/566 |
| 2010/0220296 | A1* | 9/2010 | DePoar | G03B 21/00 353/30 |
| 2011/0214359 | A1* | 9/2011 | Magpuri | E04H 3/22 52/9 |
| 2011/0234920 | A1* | 9/2011 | Nelson | H04N 9/3147 348/745 |
| 2012/0194562 | A1* | 8/2012 | Ivashin | G09G 3/001 345/672 |
| 2012/0287407 | A1* | 11/2012 | De Paor | G03B 21/56 353/30 |
| 2013/0169888 | A1* | 7/2013 | Tannhauser | H04N 9/3147 348/745 |
| 2014/0078399 | A1* | 3/2014 | Frouin | H01Q 25/005 348/516 |
| 2014/0313423 | A1* | 10/2014 | Johnson | G03B 21/13 348/745 |
| 2014/0368614 | A1* | 12/2014 | Imai | G01B 21/047 348/47 |
| 2015/0054963 | A1* | 2/2015 | Athavale | G06F 3/011 348/164 |
| 2015/0065260 | A1* | 3/2015 | Beyr | A63G 31/16 472/60 |
| 2015/0109648 | A1* | 4/2015 | Uchiyama | G02B 5/0252 359/8 |
| 2016/0073070 | A1* | 3/2016 | Spearman | H04N 9/3185 348/745 |
| 2018/0139420 | A1* | 5/2018 | Liu | G03B 21/60 |
| 2018/0324396 | A1* | 11/2018 | Ishikawa | G03B 21/00 |
| 2018/0364462 | A1* | 12/2018 | De Meerleer | G02B 13/06 |

FOREIGN PATENT DOCUMENTS

| | | |
|---|---|---|
| JP | 8-44291 | 2/1996 |
| JP | 2003-241303 | 8/2003 |
| JP | 2005-31270 | 2/2005 |
| JP | 2006-145614 | 6/2006 |
| JP | 2007-333870 | 12/2007 |

* cited by examiner

IMAGE PROJECTION DEVICE AND PLANETARIUM APPARATUS USING SAME

CROSS REFERENCE TO RELATED APPLICATIONS

This application relates to, and claims priority from, SN PCT/JP2017/010855 filed Mar. 17, 2017, the entire contents of which are incorporated herein by reference, which in turn claims priority to JP Ser. No. 2016-057674 filed Mar. 22, 2016.

FIGURE SELECTED FOR PUBLICATION

FIG. 2

BACKGROUND OF THE INVENTION

Field of the Invention

The present invention relates to an image projection device used in a planetarium, and to a planetarium apparatus using the image projection device.

Description of the Related Art

Well known is the idea of the introduction of a video projector to a planetarium, the video projector projecting via an optical system images that have been generated on an image display such as liquid crystal or the like.

The above-described video projector facilitates providing vision of moving images. Therefore, using this in a planetarium is very valuable in assisting planetarium rendering for various visual expressions.

An image projection system using the above-described video projector is referred to as a digital planetarium, and projects computer-graphics-based images in real time, thereby enabling projection of more than hundreds of thousands of small solar system bodies and an infinite number of artificial celestial bodies as well as a starry sky viewed from a point at a large distance from the solar system.

Using a combination of such dynamic images and a starry sky produced by an optical planetarium projector (for example, Patent Literature 1) enables unprecedented visual expressions, such as display of various coordinate systems on the celestial sphere, display of a trajectory of a star, and the like.

In the above-described planetarium, a single or several video projector(s) is stationarily installed in the margin or around the center of the dome to be oriented in a particular direction to cover the dome projection plane.

Specifically, in the case of using a single video projector, the single video projector projects an image to occupy the entire dome surface. And, in the case of using several video projectors, images of the respective projectors are projected respectively onto corresponding regions of the dome surface, and the images are pieced together to occupy the entire dome surface.

Accordingly, for a planetarium rendering, reproduction of motion of a certain object such as e.g., a star, a flight vehicle and/or the like is represented by moving the certain object in moving images projected within the fixed region(s), that is, by changing the images.

CITATION LIST

Patent Literature

Patent Literature 1: JP Unexamined Patent Application Publication NO. 2006-145614

ASPECTS AND SUMMARY OF THE INVENTION

Technical Field

However, considering the movement of a minute light spot in the image, the light spot moves discretely along the pixel array of the projector, so that this movement cannot not be seen as sequential movement of the object of interest, resulting in an unnatural image.

To avoid such unnatural images, in general, anti-aliasing is performed on the images. However, as a natural result, the computing cost is increased. Further, in a point light source image such as of a starry sky, an object originally falling within a single pixel has an unnatural size requiring 4 pixels or 9 pixels. Therefore, effective use of the resolution of the projection device cannot be made.

In the case of a television as a typical image medium, a viewing distance is defined such that a pixel of an image corresponds to an arc minute which is an angle corresponding to 1.0 visual acuity. Because of this, in order to achieve equivalent resolution on the dome screen in the digital planetarium using anti-aliasing, the resolution on the meridian of the dome is required to be of the order of 21,600 pixels to 32,400 pixels. An image with such high resolution involves enormous cost for building a device for projecting the image as well as many costs for generating an image to be projected, which thus is not practical.

An image projection device according to the present invention has been created in view of the above issues. Specifically, it is an object to provide an image projection device at low cost to implement natural movement of an object in images projected onto a dome surface while maintaining its original resolution without an increase in resolution of a video projector as the projection device.

Solution to Problem

An aspect of the present invention provides an image projection device that projects images onto a dome-shaped screen and includes an aggregate of two or more video projectors projecting moving images. The aggregate is placed within a dome to allow a range of projection from the aggregate to cover an entire sphere and the aggregate is mounted on a stand having two or more rotating shafts.

Another aspect of the invention also uses the image projection device in a planetarium apparatus, and provides a planetarium apparatus that projects images onto a dome-shaped screen and includes an aggregate of two or more video projectors projecting moving images. The aggregate is placed within a dome to allow a range of projection from the aggregate to cover an entire sphere and the aggregate is mounted on an optical planetarium projector having two or more rotating shafts.

Specifically, a single video projector or a plurality of video projectors has been previously used to define a dome-shaped projection plane alone, which is the dome screen, as the image projection range, but in the present invention, an image system is constructed to use at least two or more video projectors to define the entire sphere including the hemisphere without the presence of the screen, as the projection range, and the image system is mounted on the stand having two or more movable shafts. And, using an optical planetarium projector as the stand having the movable shafts enables synergistic use in the planetarium dome.

Advantageous Effects of Invention

In the present invention, at least two or more video projectors are mounted on the stand having two or more movable shafts, in which the two shafts are, for example, an X shaft and a Y shaft, and, depending on a combination of rotations of these shafts, the video projector is movable to direct its projection direction in all directions.

In typical images, because a single projector or a plurality of projectors has been, conventionally, fixedly placed to be directed in a specific direction to cover the doom projection plane, for the purpose of reproduce motion of a certain object, the motion has been represented by moving the certain object in the moving images projected within the fixed regions, in other words, by changing the images. Therefore, for images involving horizontal or vertical movement of a line of sight or turning of the eyepoint by tilting the head, the images are required to be generated in real time and changed. However, with the image projection device according to the present invention, there is no necessity to change the images for such changes, and all the changes can be handled by rotating the movable shafts.

This enables a change of the line-of-sight directions during reproduction, that is, the front directions even in pre-generated images such as movies if images for every direction are prepared beforehand, thus making it possible to produce similar effects to the images generated in real time.

Further, for astronomical images such as of planetariums, even a change in time or observation point and also a change in line-of-sight direction are able to be represented by rotating the movable shafts without a change in image. In particular, using the optical planetarium projector as the stand having the movable shafts enables not only smooth reproduction of these motions and movements but also image development in which images are precisely aligned with each other even in the use of a combination of the image of the video projector and the image of the optical planetarium projector.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
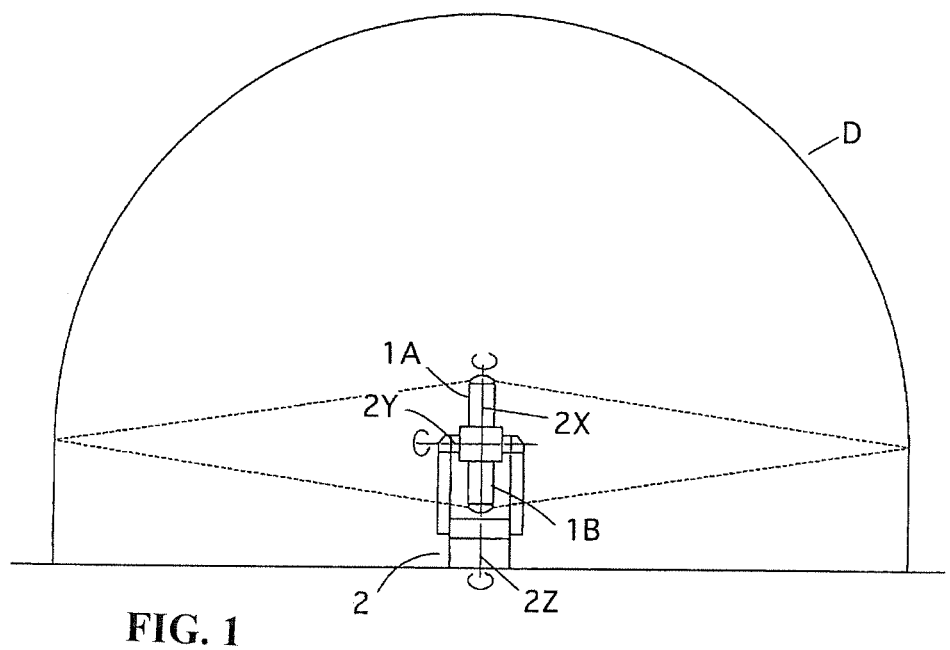
FIG. 1 is a front view of an image projection device according to the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

In the present text, numerous specific details are set forth in order to provide a thorough understanding of exemplary versions of the present invention. It will be apparent, however, to one skilled in the art, that some versions of the present invention may possibly be practiced without some of these specific details. Indeed, reference in this specification to "a variant," "variants," and "one/the variant," or "one version," "a version" and the like, should be understood to mean that a particular feature, structure, or characteristic described in connection with the variant or version is included in at least one such variant or version according to the disclosure. Thus, the appearances of phrases such as "in one variant," "in one version," and the like, in various places in the specification are not necessarily all referring to the same version or variant, nor are separate or alternative versions or variants mutually exclusive of other versions or variants. Moreover, various features may be described which possibly may be exhibited by some variants or versions and not by others. Similarly, various requirements are described which may be requirements for some variants or versions, but not others. Furthermore, as used throughout this specification, the terms 'a', 'an', 'at least' do not denote a limitation of quantity, but rather denote the presence of at least one of the referenced item, in the sense that singular reference of an element does not necessarily exclude the plural reference of such elements. Concurrently, the term "a plurality" denotes the presence of more than one referenced items. Finally, the terms "connected" or "coupled" and related terms are used in an operational sense and are not necessarily limited to a direct connection or coupling.

Various operations may be described as multiple discrete operations in turn, in a manner that may be helpful in understanding embodiments of the present invention; however, the order of description should not be construed to imply that these operations are order dependent.

Specific example embodiments of an image projection device and a planetarium apparatus in accordance with the present invention will now be described with reference to the accompanying drawings. FIG. 1 is a diagram illustrating an example where two video projectors 1A, 1B are used for projection onto the all regions of a dome screen D.

Combining the video projectors 1A, 1B with a fisheye lens with a 180-degree angle of view or wider allows an image to occupy the entire dome surface by a single monocular projector.

The video projectors 1A, 1B are configured to be oriented in the directions opposite to each other as an aggregate, and mounted on a stand having three rotating shafts 2X, 2Y, 2Z.

Images for the video projectors 1A, 1B may be provided directly to the video projectors through wireless connectivity. Alternatively, a computer for image generation may be placed in the stand so that an instruction may be provided externally to the computer to cause it to generate images.

At this time, images to be projected by the individual video projectors 1A, 1B are generated basically with a line-of-sight vector of an image being fixed. Because of this, for example, the video projector 1A projects an image above the horizon, and the video projector 1B projects an image below the horizon (an appearance of the ground and/or the like), in which an observer's line-of-sight is represented on the dome screen D by rotating each shaft of the stand 2.

As can be seen from this, what is required is for an image projected from the video projector 1A, 1B to depict movement or change of an object itself included in the image and only a change in image caused by a change in position of an observer.

Figure 2:
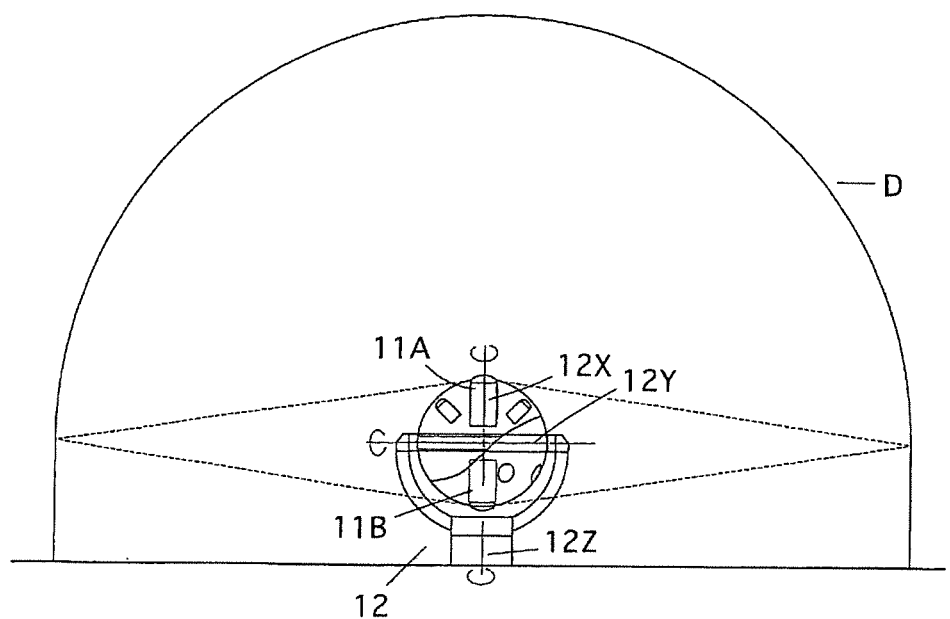
FIG. 2 is a front view of a planetarium apparatus according to the present invention.

FIG. 2 is a diagram illustrating a planetarium apparatus with two video projectors 11A, 11B being combined with an optical planetarium projector 12.

Combining the video projectors 11A, 11B with a fisheye lens with a 180-degree angle of view or wider allows an image to occupy the entire dome surface by a single monocular projector.

The video projectors 11A, 11B are configured to be oriented in the directions opposite to each other as an aggregate, and mounted on the optical planetarium projector 12.

The optical planetarium projector 12 has a well-known configuration with three rotating shafts 12X, 12Y, 12Z.

Similarly to the forgoing example embodiment, images for the video projectors 11A, 11B may be provided directly to the video projectors through wireless connectivity. Alternatively, a computer for image generation may be placed in the optical planetarium projector so that an instruction may be provided externally to the computer to cause it to generate images.

At this time, because of a state of a fixed mutual positional relationship between a starry sky projected by the optical planetarium projector 12 and images projected by the video projectors 11A, 11B, for example, in agreement with the starry sky projected from the optical planetarium projector, a picture/pictures of stars and/or lines connecting the stars to each other projected from the video projectors are able to be displayed while precise positional alignment is achieved.

In this case, even if the rotating shaft of the optical planetarium projector 12 is moved to effect a change in position of the projected starry sky, any change is not required in the image by the video projector.

Figure 3:
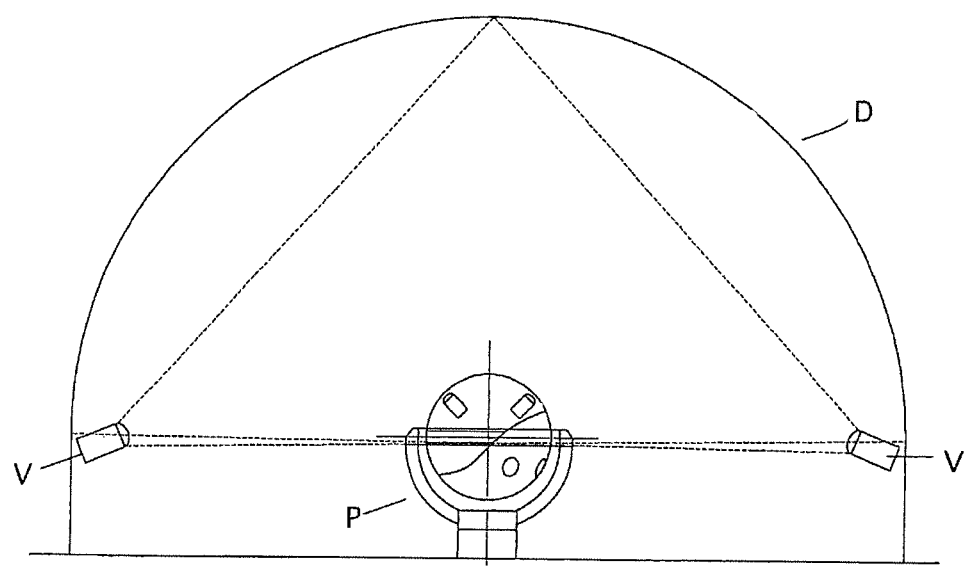
FIG. 3 is a front view of an image projection device in the conventional art.

FIG. 3 is a diagram illustrating a projection system with a combination of video projectors V and an optical planetarium projector P in the conventional art as an example comparison.

In such a projection system, when a positional change occurs in the starry sky projected by the optical planetarium projector, a change also occurs in the starry sky presented by the planetarium when viewed from a position in which the video projector is installed. Because of this, the images projected by the video projectors are required to be changed in succession in response to movement in the starry sky.

Because the video projectors are placed in the margin of the dome screen D, the images of the video projectors are greatly distorted and therefore the distortion is required to be corrected with precision.

In a large structure such as a dome screen, it is difficult to maintain the screen surface in the complete spherical state, and the shape of the screen surface is varied every moment by factors including temperatures and the like. The amount of change is very small, but there is a disadvantageous problem of misalignment occurring between the image projected by each video projector placed in the margin of the dome and the image projected by the optical planetarium projector placed at the center of the dome. If the configuration illustrated in FIG. 2 is employed, because both of the projectors emit projection light beams from approximately the same point, the influence of the distortion on the dome screen plane is able to be significantly reduced. In this respect, the benefit of the invention is evident.

REFERENCE SIGNS LIST

D . . . Dome screen
1A . . . Video projector
1B . . . Video projector
2 . . . Stand
11A . . . Video projector
11B . . . Video projector
12 . . . Optical planetarium projector Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

The invention claimed is:

1. An image projection device, that projects images onto a dome-shaped screen, comprising:
   an aggregate system comprising at least two video projectors each of which projects a video during a use, said at least two video projectors configured to be oriented in directions opposite to each other as an aggregate, said at least two video projectors having at least a 180-degree angle of view;
   a stand having at least three axes of rotation, the at least two video projectors being mounted on the stand;
   said aggregate system operably mounted on said stand; and
   said aggregate system and said stand inside said dome-shaped screen so that a range of projection from said aggregate system covers an entire hemisphere of said dome-shaped screen during said use, the aggregate being directed in a direction that depends on a combination of rotations of the three rotatable shaft axes;
   wherein:
   said aggregate system, further comprises:
   a unified point of projection; and
   a projection from each of said at least two video projectors that projects said video during said unified point of projection to cover said entire hemisphere of said dome-shaped screen during a use.

2. A planetarium apparatus, comprising:
   an image projection device;
   said image projection device, further comprising:
   an aggregate system having at least two video projectors that project a video during a use, said at least two video projectors configured to be oriented in directions opposite to each other as an aggregate, said at least two video projectors having at least a 180-degree angle of view;
   a stand having at least three rotatable shaft axes, the at least two video projectors being mounted on the stand;
   said aggregate system mounted on said stand operable along said rotatable shaft axes;

said aggregate system placed inside a dome-shaped screen so that a range of projection from said aggregate system covers an entire inner projection surface of said dome-shaped screen, the aggregate being directed in a direction that depends on a combination of rotations of the three rotatable shaft axes;

wherein:
said aggregate system, further comprises:
a unified point of projection from a single monocular projector; and
a projection from each of said at least two video projectors projects said video during said use during said unified point of projection to cover an entire hemisphere of said dome-shaped screen during a use.

* * * * *